3,262,482
ADHESION OF ETHYLENE-PROPYLENE-DIENE TERPOLYMER RUBBER TO TEXTILES

Maurice C. Clifton, Grosse Pointe Park, Parks M. Nichols, Detroit, and Victor B. Whitfield, Berkley, Mich., assignors to United States Rubber Company, New York, N.Y., a corporation of New Jersey
No Drawing. Filed June 17, 1963, Ser. No. 288,523
7 Claims. (Cl. 152—330)

This invention relates to a method of adhering EPDR (unsaturated, vulcanizable rubbery terpolymer of ethylene, propylene and a copolymerizable diene such as dicylcopentadiene or 1,4-hexadiene) to a textile material. More particularly it relates to an improved method of adhering tire cord to EPDR tire carcass stock, as well as to improved tires made by such method.

Adhesion of the EPDR rubber to textile materials has proven to be a particularly difficult problem, so much so that it has been difficult heretofore to make a tire having a carcass made of textile-reinforced EPDR that would have a satisfactory service life. Thus, if it is attempted to adhere rayon or nylon tire cord to an EPDR carcass stock, using what is considered to be a good conventional tire cord adhesive (e.g., a tire cord "solution" containing vinylpyridine rubber latex, partially reacted resorcinol-formaldehyde resin and formaldehyde, in the usual proportions) for use with butyl rubber or SBR/natural rubber blends and depositing the conventional amount of adhesive on the cord in the usual way, it is unfortunately found that the adhesive bond is very poor (only 2 to 10 pounds, as compared to the usual very much higher value of 17 to 50 pounds for butyl rubber or SBR/natural rubber blend under the same conditions). As a consequence, the EPDR tire would frequently fail prematurely, for example after only say 0.5 to 10 hours on a test wheel, as compared to a more usual standard average of 50 to 150 hours for a conventional tire with a butyl rubber carcass or an SBR/natural rubber carcass, under the same conditions.

Up to the time of the present invention, the state of the art has therefore been far from satisfactory, as far as adhesion of textile materials to EPDR rubber is concerned.

In accordance with the invention, we have now found, unexpectedly, that excellent adhesion of textile material to EPDR can be obtained by employing as the adhesive composition an aqueous solution of a partially reacted resorcinol-formaldehyde resin, either alone or in combination with a rubber latex, provided that the total dry solids deposit on the textile is not more than 4% by weight, preferably not more than 2% (based on the dry weight of the untreated textile as 100%), and that the weight ratio of dry rubber solids to dry resin solids is not more than 4:1. This is in contrast to the prior practice which employes a higher ratio of rubber to resin and requires a much greater deposit of adhesive on the textile, for reasonably good adhesion to butyl rubber or SBR/NR blend.

In fact, the adhesion in the present invention has been observed to improve with decreasing rubber:resin ratio down to about 0.6:1. Adhesion remains good as the ratio is further reduced from 0.6:1 to zero (no rubber at all). However, good tires can be made with rubber:resin ratios less than 3:1, say about 2.7:1 or less, and even higher ratios, up to about 4:1 yield good enough adhesion for some purposes, but the preferred ratios are less than 1:1.

It has been found that the use of such a relatively low ratio of rubber to resin in the treating solution coupled with deposition of a relatively small amount of adhesive on the textile surprisingly makes possible adhesive bonds to EPDR having a strength of the order of 15–45 pounds as compared to the aforementioned mere 2–10 pounds if conventional type adhesives are employed in an attempt to bond EPDR to textiles. It is remarkable that pneumatic tires made with carcasses based on EPDR rubber bonded to textile tire cord reinforcement by the method of the invention, using a low ratio of rubber to resin in the treating solution and depositing a very small amount of adhesive on the tire cord, are capable of prolonged use without failure of the textile-rubber adhesive bond; for example such tires may typically last for as much as 30 to 120 hours on a test wheel without adhesive failure, as compared to the previously mentioned figure of only 0.5 to 10 hours for a tire based on EPDR bonded to tire cord using a solution having the conventional high ratio of rubber to resin applied so as to produce the conventional high pick-up of adhesive.

It is a peculiar feature of the invention that it is not necessary to use any rubber latex in the adhesive solution in order to get good bonding. This is indeed contrary to prior practice, wherein the use of latex in the tire cord solutioning bath is considered to be essential. However, if desired the presently employed tire cord solution may contain a latex or artificial dispersion of a rubber, particularly if it is desired to plasticize the adhesive resin coating on the textile to obtain greater flexibility or to improve the raw-adhesion of the treated cord to the EPDR stock.

The results obtained by the method of the invention involving the use of a low rubber to resin ratio in the adhesive solution and a low pick-up of adhesive on the cord are particularly surprising in view of the fact that if a similar method is employed when attempting to adhere other rubbers, such as butyl rubber or a blend of SBR and natural rubber, the adhesive bond obtained is decidedly inferior and unsatisfactory (for example adhesive bond strength of as little as 3 to 12 pounds and test wheel life as little as 5 to 25 hours, measured under the same conditions as the figures previously mentioned). Therefore, it was indeed unexpected to find that in the case of EPDR rubber, remarkably superior adhesion can be obtained by employing a low rubber/resin ratio in the solution and lowering the adhesive pick-up on the cord, as described. It is also noteworthy that if even a relatively small amount of butyl rubber is blended with the EPDR, and it is attempted to use the method of the invention with such blend, the adhesion falls off rapidly. This emphasizes the criticality of the invention, particularly with regard to its peculiar and unexpected applicability in the case of EPDR rubber.

It is desired to emphasize that in order to enjoy the advantages of the invention it is essential to employ both of the critical novel features described, that is, it is not sufficient merely to use a low rubber/resin ratio in the treating solution; neither is it sufficient merely to reduce the adhesive pick-up on the cords. On the contrary, both of these changes from conventional practice must be made in order to enjoy the advantages of the invention.

In practicing the invention the textile material is treated with an aqueous solution of partially reacted resorcinol-formaldehyde resin and formaldehyde, either alone or in admixture with rubber latex, for example by dipping the textile in the solution, or by otherwise applying the solution. The desired low pick-up of adhesive, in amount previously specified, is achieved by making the dip solution relatively dilute and squeezing or otherwise expressing the solution from the textile material in a carefully controlled manner, for example by the use of rubber-covered squeeze rolls having a pressure-adjusting means (and/or by directing a blast of air at the textile after the dipping), so as to leave only a definite desired amount of the solution on the textile, sufficient to deposit only the critical, small amount of adhesive. The textile is then dried and thereafter the vulcanizable EPDR rubber stock is laminated to the textile, for example by skim coating the rubber stock onto the textile with the aid of a calender, after which the resulting laminate is subjected to conventional vulcanizing conditions to vulcanze the rubber, which thereby becomes securely bonded to the resin-treated textile.

In practice, the solids content of the adhesive solution is usually within the range of from 0.05 to 10.0%. The amount of resin solids in the adhesive solution is usually from 0.05 to 10.0%. If rubber is used, the amount of rubber solids in the solution (actually, the rubber is of course dispersed rather than in true solution) usually ranges up to 8.0%, it being understood that in any case the prescribed ratio of rubber/resin solids is observed.

The fabric to which the adhesive treatment of the invention is applied may be any conventional fabric such as is useful for reinforcing rubber articles such as tires, hose, belts, or similar mechanical rubber goods which may be fabricated by the method of the invention. The fabric may be a natural fabric such as cotton, or it may be rayon or other suitable synthetic fabric such as nylon, or polyester fabric. The textile material may be in any convenient form, such as the form of the cord fabric or woven fabric, whether mono-filament or multi-filament cords, plied yarns, or staple fiber.

The EPDR rubber to which the invention applies may be described as a sulfur-vulcanizable rubber-like interpolymer of ethylene and propylene and a copolymerizable diene such as dicyclopentadiene, methyl cyclopentadiene dimer, 1,4-hexadiene, 11-ethyl-1, 11-tridecadiene, 1,9-octadecadiene, or other suitable dienes such as are disclosed in British Patent 880,904 of Dunlop Rubber Co., October 25, 1961, or U.S. Patents 2,933,480, Gresham and Hunt, April 19, 1960, and 3,000,866, Tarney, September 19, 1961, the disclosures of which are hereby incorporated herein by reference. Preferred are dicyclopentadiene and 1,4-hexadiene.

A partially-reacted resorcinol-formaldehyde resin suitable for use in the invention may be made by condensing resorcinol and formaldehyde (1 to 1.8 moles of formaldehyde to 2 moles of resorcinol) by moderate heating in fairly concentrated aqueous solution, until a resin having a ball and ring softening point of 102–112° C. is formed. A catalyst such as oxalic acid may be used, but is not essential. The resin is soluble in ammonia water (25% NH$_4$OH), with which it may be diluted to provide the desired solids content. A material of this kind is represented by such commercially available resins as Koppers R–2170. It is known that such a resin cures to an insoluble, infusible state when heated in the presence of additional formaldehyde (or a formaldehyde-yielding agent). However, for purposes of the invention it is found that it is not essential to employ additional formaldehyde (it is possible that the resin may react with the EPDR or some component of the stock and so become "cured," but this is not certain). Usually about 5 to 30 parts of formaldehyde per 100 parts by weight of resin are used, preferably about 5 to 20 parts of formaldehyde per 100 of resin. (In speaking of parts formaldehyde per 100 parts resin we refer to the weight of partially reacted resorcinol-formaldehyde resin without the added formaldehyde. When we refer to rubber/resin ratio we refer to the reaction product of partially reacted resin and added formaldehyde—or combined resin plus formaldehyde). In accordance with the present invention it is found that the best adhesion is obtained when formaldehyde is used in the ratio of about 13 parts of formaldehyde to 100 parts of resin. This is considerably less formaldehyde than is used in adhesives for the usual diene rubbers. When no formaldehyde is used, the adhesion to EPDR is somewhat more than about half as good, but is still good as judged by comparison with adhesion systems in commercial use. Therefore, the invention extends to the use of no added formaldehyde, although the adhesion is better if some formaldehyde is used. As will be pointed out below, certain practical considerations aside from adhesion per se (such as solution stability, and effect of either excess formaldehyde or resorcinol on textile cord) are often determining factors in setting the formaldehyde:resin ratio in any given situation.

In view of conventional practice which usually employs about one part additional formaldehyde for each four parts of partially reacted resorcinol formaldehyde resin it was surprising to find that the amount of additional formaldehyde required for the practice of the present invention could be varied over such broad limits, and could indeed be omtted completely and still obtain quite good adhesion. In actual practice the amount of formaldehyde employed in the present invention depends upon the type of textile material, the dip concentration, details of the stock formulation, etc. A relatively high level of formaldehyde tends to cause instability of the adhesive dip solution especially when the concentration of resin is on the high side. At the other extreme, very low levels of formaldehyde allow incompletely reacted resorcinol resin to remain on the cord with resultant damage to certain type cords, notably nylon. Excess amounts of formaldehyde, on the other hand, are to be avoided since this also may have a degrading effect on rayon cord. The determination of the optimum amount of formaldehyde is, accordingly, a matter of balancing a number of factors which are more or less independent from the matter of adhesion of rubber to textile material. Thus, from the standpoint of rubber to textile adhesion alone, the amount of formaldehyde can be varied, but from the practical standpoint in any given application there will be an optimum range of formaldehyde levels which will give most satisfactory results.

As stated previously, a rubber latex or dispersion may be included in the adhesive solution, but is optional. Such latex may be natural rubber, and/or a synthetic rubber such as SBR, butadiene-vinylpyridine rubber (including copolymers of butadiene and vinylpyridine additionally containing styrene or the like), artificial butyl rubber latex, EPDR latex, or various mixtures thereof. Alternatively or additionally, an emulsion or equivalent preparation of thermosetting acrylic polymer may be included, such as a copolymer containing methacrylamide and methacrylic acid or the like (e.g., "Rhoplex AC–201"). If used, the rubber or similar polymer latex must be employed in such quantity as to make the rubber to resin ratio in the treating solution less than 4:1 as stated before (in determining the ratio the "Rhoplex" is calculated as part of the rubber). Any other suitable conventional compounding ingredients such as accelerators, antioxidants, curatives, stabilizers, and the like, commonly used in tire cord solutioning may be included if desired.

As described previously, the adhesive solution is applied to the tire cord under such conditions as to produce a critically limited amount of adhesive solids pick-up, not more than 4 parts, preferably less than 2 parts, of adhesive solids per 100 parts of untreated cord. The adhesion at a pick-up of 4 parts is not as good as the adhesion at a pick-up of 2 parts, but it may be adequate for some uses. Preferably the amount of adhesive deposited on the cord is even less than 2 parts, say not more than 1 part of adhesive solids. In fact, extremely small quantities, of the order of only 0.1 part of adhesive solids are more than sufficient to produce useful adhesion. However, as a practical matter the amount of adhesive pick-up on the cord will not ordinarily be less than 0.5%, for purposes of the invention. It is desired to point out that the figures on the pick-up are subject to some variation depending on the technique of measurement, and the determination of the exact pick-up at very low levels is particularly difficult and subject to error, but the figures given are believed to be essentially in accordance with the actual pick-up, as far as can be determined with the methods and data available.

In order to produce the desired pick-up of dry adhesive solids on the textile, the concentration of adhesive solids in the adhesive solution with which the textile is treated will generally be of the order of 0.1% to 10% (such concentrations are believed to produce pick-up of dry solids on the textile of the order of 0.1 to 2%). The achievement of good adhesion by dips containing only 0.1% resin is completely unexpected and is in no way suggested by the published literature or prior practice. The corresponding solids deposit on the cord is obviously very low, and although the exact value is not known with certainty it is believed to be of the order of only about 0.1%. A distinguishing feature of the invention is that the adhesion of EPDR to cord treated as described increases as the dip concentration decreases. This is directly contrary to data showing that adhesion of NR to cord dipped in a vinylpyridine latex/resorcinol-formaldehyde resin adhesive solution increases as the dip concentration increases.

As indicated, the cord is dried after treatment with the adhesive solution. This drying is carried out under conditions which bring about cure of the resin. For this purpose, a temperature of at least 250° F. is necessary, preferably somewhat higher, say 325° F. Even higher temperatures may be used if desired, up to for example 450° F., but it is ordinarily not necessary to use a temperature higher than 325° F.

After drying, the EPDR rubber stock which it is desired to adhere to the textile is brought into firm contact with the adhesive-treated surface of the textile. The EPDR stock is compounded for vulcanization in the conventional manner, using for example sulfur or sulfur-donor curatives, usually with appropriate accelerators of sulfur vulcanization and other conventional compounding ingredients. Other curatives, such as organic peroxides (e.g., dicumyl peroxide) may be used in addition to sulfur-type curatives. The EPDR may be oil-extended, if desired (using, for example up to 100 or more parts of oil per 100 of rubber). It may be blended with saturated EPR (ethylene-propylene copolymer rubber) if desired. Fillers also may be present, notably carbon black, silica, and the like, in conventional amounts, along with antioxidants or similar preservatives and any other suitable desired conventional compounding ingredients, in accordance with the usual practice. The laminate thus produced is then vulcanized at elevated temperature, usually under pressure in a mold, whereupon a remarkably firm bond is produced between the EPDR and the textile.

The following example will serve to illustrate the practice of the invention in more detail.

Example 1

The following EPDR stock is prepared by conventional laboratory mixing techniques.

| | Parts by weight |
|---|---|
| EPDR | 100 |
| FEF black | 36 |
| HAF black | 36 |
| Hydrocarbon oil | 40 |
| Stearic acid | 1 |
| Zinc oxide | 5 |
| Mercaptobenzothiazole | 0.5 |
| Tetramethylthiuram monosulfide | 1.5 |
| Sulfur | 3.0 |
| Total | 223.0 |

The EPDR employed may be, for example, a rubbery terpolymer containing, by analysis, 40% ethylene, 55% propylene and 4% 1,4-hexadiene on a weight basis, and 52% ethylene, 46% propylene and 2% 1,4-hexadiene on a rubber basis, Mooney viscosity 80–90 ML–4–212° F. (e.g., "Nordel"). The hydrocarbon oil may be, for example, conventional rubber softening or extending or process oil, such as petroleum hydrocarbon oil, particularly naphthenic coastal tail oil; API gravity 25.7; specific gravity 0.9001; color (Robinson) 12¾; flash point (open cup) 440° F.; Saybolt viscosity 514.5 at 100° F. and 58 at 210° F.; viscosity index 60.5 (e.g., "Necton–60").

The EPDR, carbon blacks, oil, stearic acid and zinc oxide are mixed in a "B" Banbury mixer allowing the batch to reach a temperature of 340° F. before discharge from the mixer. Sulfur and accelerators are added on a laboratory mill.

The cord treating solution is made up as follows:

(1) A "Resin Masterbatch" is prepared by diluting resorcinol-formaldehyde resin solution first with ammonia solution and then with water as follows:

| | Parts by weight |
|---|---|
| Resorcinol-formaldehyde resin solution (75% solids) | 43.84 |
| Ammonia solution (25% $NH_4OH$) | 12.00 |
| Water | 144.16 |
| Total | 200.00 |

The resorcinol-formaldehyde resin solution may be made as described previously, or it may be an equivalent commercially available resin such as Koppers R–2170 or Schenectady Chemical 1505A—see Example 2, Part B, below, for typical experimental details.

(2) The following ingredients are then mixed, in order, with stirring.

| | Parts by weight |
|---|---|
| Water | 25578.4 |
| Vinyl pyridine latex (40% solids) | 250.0 |
| Resin masterbatch (16% solids) | 937.5 |
| Formaldehyde solution (8½%) | 234.1 |
| | 27000.0 |

The vinyl pyridine latex may be 90/10 butadiene/vinyl pyridine copolymer latex, (e.g., "Pyratex").

This then results in a cord treating solution having approximately 1% solids; the ratio of rubber solids to resin solids is 0.6:1.

Nylon tire cord (style 9700) is passed through the above solution, the excess solution is blown off with an air blast, and the treated cord wound on a cotton duck covered drum and allowed to dry over-night. The pick-up is 1.6%.

The following day the cord is removed from the drum and heat treated in a circulating air oven for three and one half minutes at 325° F.

Two different type tests are carried out to evaluate adhesion of the EPDR stock to the treated cord; the well known "H-Adhesion" test, and a special test which measures the strength of the cord-stock adhesive bond after the sample has been subjected to a severe flexing procedure which places high shear strains on the cord-stock bond and at the same time raises the temperature of the sample to a temperature comparable to that of a tire in severe service.

(a) *H-adhesion test.*—The EPDR stock is calendered onto one side of a sheet of square woven cotton duck and the coated fabric cut into strips ⅜ inch wide.

The treated cords are placed between the ⅜ inch wide fabric strips, the EPDR coated side facing the cord, to make conventional "H-Adhesion" samples. The samples are cured 30′ to 320° F. and allowed to rest a minimum of 24 hours before testing. The samples are tested at 250° F. in a Scott Tensile Tester equipped with a temperature controlled air chamber.

(b) *Flexed adhesion test.*—The sample used in this test consists of a block of EPDR stock 1 inch x 0.5 inch x 0.5 inch with a single treated cord passing through the center of the sample so that a 0.5 inch length of cord is embedded in the rubber. These samples are prepared using the stock and treated cord described above and curing 30' at 350° F. (platen temperature) in a mold designed for the purpose. After cure, the sample is placed in a Goodrich Flexometer with the long dimension of the sample and the cord parallel to the platens and the sample is flexed for 15 minutes with an oven temperature 212° F., stroke 0.075 inch, load on the beam 41 pounds, and speed 1800 r.p.m. After this flexing period the sample is allowed to rest a minimum of 30 minutes; then the sample is placed in a Dillon Tensile Tester and the cord pulled out. The force required to pull out the cord is recorded as the "Flexed Adhesion."

The results are summarized in the table below.

*Example 2*

*Part A.*—The following cord treating solution is made up using the same "Resin Masterbatch" as described in Example 1:

| | Parts by weight |
|---|---|
| Water | 15818 |
| Resin masterbatch (16% solids) | 938 |
| Formaldehyde solution (8½%) | 234 |
| | 16990 |

The solids content of the treating solution is 1%; the ratio of rubber solids to resin solids is zero (no rubber present).

Nylon cord (style 9700) is treated in this solution using the same procedure as in Example #1. The pick-up is 0.4%.

Samples are prepared, cured, and tested using the same procedure as in Example #1 but using the following EPDR stock:

| | Parts by weight |
|---|---|
| EPDR | 100 |
| FEF black | 36 |
| HAF black | 36 |
| Oil | 40 |
| Stearic acid | 1 |
| Zinc oxide | 5 |
| Mercaptobenzothiazole | 0.5 |
| Tetramethylthiuram monosulfide | 1.5 |
| Oiled crystex (80% sulfur, 20% oil) | 3.74 |
| Total | 223.74 |

The EPRD in this example is a rubbery terpolymer containing, by analysis, 34% ethylene, 60% propylene and 6% dicyclopentadiene on a weight basis, and 45% ethylene, 53% propylene and 2% dicyclopentadiene on a molar basis, Mooney viscosity 40–60 ML–4–212° F.

The oil may be a petroleum oil of the type classified as naphthenic rubber processing or extending oil; API gravity 18.2; specific gravity 0.9454; flash point (open cup) 435° F.; Saybolt viscosity 85 at 210° F.; aniline point 174° F.; Viscosity-Gravity Constant (VGC) 0.885, e.g., "Circosol 2xH."

The results are given in the table below.

*Part B.*—Resin is prepared by mixing 23 grams (0.2 mole) of 95% resorcinol, 4.4 grams (0.14 mole) of finely powdered 95% paraformaldehyde and 4.0 cc. of water and heating gently while shaking in a 250 cc. beaker. The reaction started at an elapsed time of 3 minutes at about 100° C. The mixture was shaken vigorously for the next minute during which time the temperature rose to 132° C. The mixture was allowed to stand for one hour during which the temperature gradually dropped to 30° C. It was then heated to 130–140° C. for 20 minutes.

A resin masterbatch was made up according to the following:

| | Parts by weight |
|---|---|
| Above resin | 16.0 |
| 25% ammonia water | 6.0 |
| Water | 78.0 |
| Total | 100.0 |

The mixture was allowed to stand over-night; solution of the resin was completed by stirring.

When this resin masterbatch was substituted for the resin masterbatch in Part A, the flexed adhesion value was 32 pounds. All other details were the same as Part A.

*Example 3*

The following cord treating solution is made up using the same materials and procedures as described in Examples 1 and 2:

| | Parts by weight |
|---|---|
| Water | 4495 |
| Resin masterbatch (16% solids) | 938 |
| Formaldehyde (8½%) | 234 |
| Total | 5667 |

The solids content of the treating solution is 3.0%; the ratio of rubber solids to resin solids is 0 (no rubber present).

Rayon cord (style 3400) is treated in this solution using the same procedure as in Examples 1 and 2. The pick-up is 1.1%.

Samples are prepared, cured, and tested using the same EPDR stock and the same procedure as in Example 1.

The results are summarized in the table below:

*Example 4*

The following cord treating solution is made up using the same materials and procedures as in Example 1:

| | Parts by weight |
|---|---|
| Water | 7145 |
| Vinyl pyridine latex (Pyratex=40% solids) | 250 |
| Resin masterbatch (16% solids) | 938 |
| Total | 8333 |

The solids content of the treating solution is 3.0%; the ratio of rubber solids to resin solids is 0.6:1.

Nylon cord (style 9700) is treated in this solution using the same procedure as in Example 1. The pick-up is 1.8%.

Samples are prepared, cured, and tested using the same procedure and stock as in Example 1.

At the same time, a "blank" sample is prepared and tested using the same materials and procedures except that the nylon cord is used in the "grey" form without being treated with the cord treating solution.

The following table summarizes the results for Examples 1–4.

TABLE SUMMARIZING ADHESION TEST RESULTS

| Example | Ratio Rubber: Resin Solids in Adhesive | Parts of Formaldehyde Per 100 Parts of Resin | Percent Pick-Up of Adhesive Solids on Fabric | H-Adhesion at 250° F. (pounds) | Flexed Adhesion (pounds) |
|---|---|---|---|---|---|
| 1 | 0.6 | 13.3 | 1.6 | 18.0 | 38 |
| 2 | 0.0 | 13.3 | 0.4 | 13.2 | 35 |
| 3 | 0.0 | 13.3 | 1.1 | 12.3 | 44 |
| 4 | 0.6 | 0.0 | 1.8 | (¹) | 24 |
| Blank | | | | 3 | 4 |

¹ Not tested.

The foregoing remarkable adhesion values are to be compared to values of only 3–7 pounds in the H-adhesion test and 5–18 pounds in the flexed adhesion test typically obtained if, instead of following the practice of the invention, the pick-up of adhesive solids is greater than 4% and/or the ratio of rubber to resin solids is greater than 4:1.

*Example 5*

A two-ply passenger car pneumatic tire is made in the conventional manner using nylon tire cord treated in accordance with Example 1 and using EPDR stock as in Example 1. The tire is remarkable for the length of service obtainable without failure of the adhesive bond between the tire cord treated in accordance with the invention and the EPDR rubber stock.

*Example 6*

Cord adhesion samples were prepared as described in Example 1 except that the amount of water used in preparing the dip was varied to give different dip concentrations from 0.75% to 17% solids and the air blast setting was varied between A and B (more intense blast).

Two different procedures were used to determine dip pick-up.

Procedure A is described as "Proposed Procedure for Dip Pick-Up, Method A, for Nylon" in the ASTM Standards on Textile Materials, D–885–59T, in an editorial note.

Procedure B consisted of a direct determination by weighing two equal lengths of cord; one of which had been dipped in water, the other of which had been dipped in the solution. In both cases the cord was treated in the standard way as described in Example 1 and dried to constant weight at 105° C. The weight difference was taken as dip pick-up.

The results obtained are shown in the table below:

| Dip Concentration | Air Setting | Solids Deposit | | H-Adhesion at 250° F. (lbs.) | Flexed Adhesion (lbs.) |
|---|---|---|---|---|---|
| | | Proc. A | Proc. B | | |
| 10% | A | 6.8 | | 6.1 | 16.0 |
| 17% | B | 4.2 | | 6.8 | 17.5 |
| 10% | B | 3.1 | | 8.4 | 21.5 |
| 5% | B | 0.9 | | 12.1 | 26.5 |
| 3% | B | | | 17.5 | 32.0 |
| 2.5% | B | 0.1 | | (1) | 30.0 |
| 1.5% | B | | | 17.2 | 31.0 |
| 1.0% | A | | 1.6 | 18.0 | 38.0 |
| 1.0% | B | | 0.7 | (1) | 31.0 |
| 0.75% | B | | | 17.1 | 26.0 |
| Control (not dipped) | | | | 3.0 | 4.0 |

[1] Not tested.

*Example 7*

Cord treating solutions were made up using the same "Resin masterbatch" as described in Example 1.

Water (as needed for desired solids).
Resin masterbatch (16% solids) _____ 938
Formaldehyde solution (8½%) _____ 234

Solutions having different solids contents from 3% down to 0.1% were made up by using the requisite amount of water.

Nylon cord (style 9700) was treated in these solutions using the same procedure as in Example 1. Pick-up was determined in two cases as described in Example 6 above.

Samples were prepared, cured and tested as in Example 1.

The results obtained are shown below:

| Dip Concentration | Air Setting | Solids Deposit | | Flexed Adhesion (lbs.) |
|---|---|---|---|---|
| | | Proc. A | Proc. B | |
| 3% | B | 1.1 | | 31.0 |
| 1% | B | | 0.4 | 35.0 |
| 0.5% | B | | | 29.0 |
| 0.2% | B | | | 32.0 |
| 0.1% | B | | | 21.0 |

Having thus described our invention, what we claim and desire to protect by Letters Patent is:

1. A method of adhering textile material to an elastomer stock in which the elastomer consists essentially of a vulcanizable ethylene-propylene-copolymerizable diene terpolymer elastomer, comprising treating the textile material with an aqueous adhesive solution comprising a rubber latex and a water soluble resorcinol-formaldehyde resin, the weight ratio of rubber to resin in the solution being from zero to 4:1, drying the treated textile, the pick-up of solids on the textile from the said adhesive solution being from 0.1 to 4% by weight of the textile, laminating the thus-treated textile to the said vulcanizable elastomer, and vulcanizing the elastomer.

2. A method as in claim 1 in which the said rubber latex in the aqueous adhesive solution is selected from butadiene-vinylpyridine copolymer latex and butadiene-styrene-vinylpyridine copolymer latex, the weight ratio of rubber to resin in said solution is from 0.6:1 to 4:1, and the pick-up of solids on the textile from the said adhesive solution is from 0.5 to 2% by weight of the textile.

3. A method as in claim 1 in which the said rubber latex in the aqueous adhesive solution is selected from butadiene-vinylpyridine copolymer latex and butadiene-styrene-vinylpyridine copolymer latex, the weight ratio of rubber to resin in said solution is from 0.6:1 to 2.7:1, the pick-up of solids on the textile from said adhesive solution is from 0.5 to 2% by weight of the textile, the said resin having a ball and ring softening point of 102°–112° C. and a mole ratio of formaldehyde to resorcinol of from 1.0:2 to 1.8:2.

4. A method as in claim 3 in which the said adhesive solution further contains from 5 to 30 parts by weight of added formaldehyde per 100 parts by weight of said resin.

5. A method as in claim 1 in which the said copolymerizable diene in the terpolymer is selected from dicyclopentadiene and 1,4-hexadiene.

6. A laminate of textile material to a vulcanized elastomer stock, the elastomer consisting essentially of ethylene-propylene-copolymerizable diene terpolymer elastomer, the elastomer being adhered to the textile by an adhesive deposit on the textile, in amount of from 0.5 to 2% by weight of the textile, deposited from an aqueous adhesive solution comprising a rubber latex, and a water soluble resorcinol-formaldehyde resin, the weight ratio of rubber to resin in the solution being from zero to 4:1, the solution being applied to the textile and dried prior to lamination with and vulcanization of the said elastomer.

7. A pneumatic tire having a carcass comprising an elastomeric vulcanizate in which the elastomer consists essentially of ethylene-propylene-copolymerizable diene terpolymer wherein the said diene is selected from 1,4-hexadiene and dicyclopentadiene, said vulcanizate being reinforced with textile cord adhered to the vulcanizate by means of an adhesive deposit on the cord applied prior to assembly with the said terpolymer from an aqueous solution containing a rubber latex, selected from butadiene-vinyl-pyridine copolymer latex and butadiene-styrene-vinyl-pyridine copolymer latex, and a water soluble resorcinol-formaldehyde resin having a ball and ring softening point of 102°–112° C. and a mole ratio or formaldehyde to resorcinol of from 1.0:2 to 1.8:2, the adhesive solution further containing from 5 to 30 parts by weight of added formaldehyde per 100 parts of said resin, the weight ratio of said rubber to resin in the adhesive being from 0.6:1 to 4:1, and the pick-up of adhesive solids on the cord being from 0.1 to 4% by weight of the cord.

References Cited by the Examiner

UNITED STATES PATENTS

| | | |
|---|---|---|
| 2,933,480 | 4/1960 | Gresham. |
| 3,060,078 | 10/1962 | Atwell. |
| 3,085,921 | 4/1963 | Zeise. |
| 3,097,110 | 7/1963 | Danielson. |
| 3,179,554 | 4/1965 | Karcher _____ 156—334 X |

FOREIGN PATENTS

| | | |
|---|---|---|
| 925,468 | 5/1963 | Great Britain. |

EARL M. BERGERT, *Primary Examiner.*

C. B. COSBY, *Assistant Examiner.*